(12) United States Patent (10) Patent No.: US 7,740,250 B2
Müller et al. (45) Date of Patent: Jun. 22, 2010

(54) LIGHT VEHICLE COMPRISING A SWING AXLE

(75) Inventors: Erich Müller, Brensbach (DE); Dieter Bulling, Bretzfeld (DE)

(73) Assignee: Thermoplastik Erich Muller GmbH, Dieburg (DE)

( * ) Notice: Subject to any disclaimer, the term of this patent is extended or adjusted under 35 U.S.C. 154(b) by 694 days.

(21) Appl. No.: 10/585,383

(22) PCT Filed: Dec. 13, 2004

(86) PCT No.: PCT/EP2004/053414

§ 371 (c)(1),
(2), (4) Date: Apr. 5, 2007

(87) PCT Pub. No.: WO2005/066007

PCT Pub. Date: Jul. 21, 2005

(65) Prior Publication Data

US 2007/0272454 A1    Nov. 29, 2007

(30) Foreign Application Priority Data

Jan. 6, 2004    (DE) .................... 10 2004 001 203

(51) Int. Cl.
*B62B 1/04* (2006.01)
*B62B 1/12* (2006.01)
(52) U.S. Cl. .............. 280/47.17; 280/74; 280/47.22; 280/47.23; 280/47.24

(58) Field of Classification Search .......... 280/47.26, 280/47.131, 47.15, 47.17, 47.18, 47.21, 47.22, 280/47.23, 63, 64, 65, 66, 74, DIG. 6; 206/315.3
See application file for complete search history.

(56) References Cited

U.S. PATENT DOCUMENTS

| 2,406,183 | A | * | 8/1946 | Allen ...................... 280/655 |
| 2,825,574 | A | * | 3/1958 | Williamson ............... 280/38 |
| 3,663,033 | A | * | 5/1972 | Story ..................... 280/47.27 |
| 4,614,349 | A | * | 9/1986 | Wenzel ................... 280/43.1 |
| 5,829,585 | A | * | 11/1998 | Kao et al. ............... 206/315.3 |
| 6,007,031 | A | * | 12/1999 | Tang ....................... 248/96 |
| 6,050,592 | A | * | 4/2000 | Kim ....................... 280/652 |
| 6,443,543 | B1 | * | 9/2002 | Chiang ................... 312/223.3 |
| 6,715,774 | B2 | * | 4/2004 | Cassoni .................. 280/47.131 |
| 7,287,765 | B2 | * | 10/2007 | Murphy et al. ........... 280/47.26 |

* cited by examiner

*Primary Examiner*—Hau V Phan
*Assistant Examiner*—John R Olszewski
(74) *Attorney, Agent, or Firm*—Dinsmore & Shohl LLP

(57) ABSTRACT

The invention relates to a light vehicle such as a golf caddie which includes a body and at least two wheels that are respectively connected to the body by first and second axles. The axles can be pivoted in a first position in which they are tilted against the body and in a second position in which they extend away from the body, where the second position is defined as the driving position of the vehicle. At least one spring acts on the body and on the axles, maintaining the driving position of the axles only by the elastic force thereof, without additional transversal supports and bracing.

13 Claims, 9 Drawing Sheets

LIGHT VEHICLE COMPRISING A SWING AXLE

Figure 1:
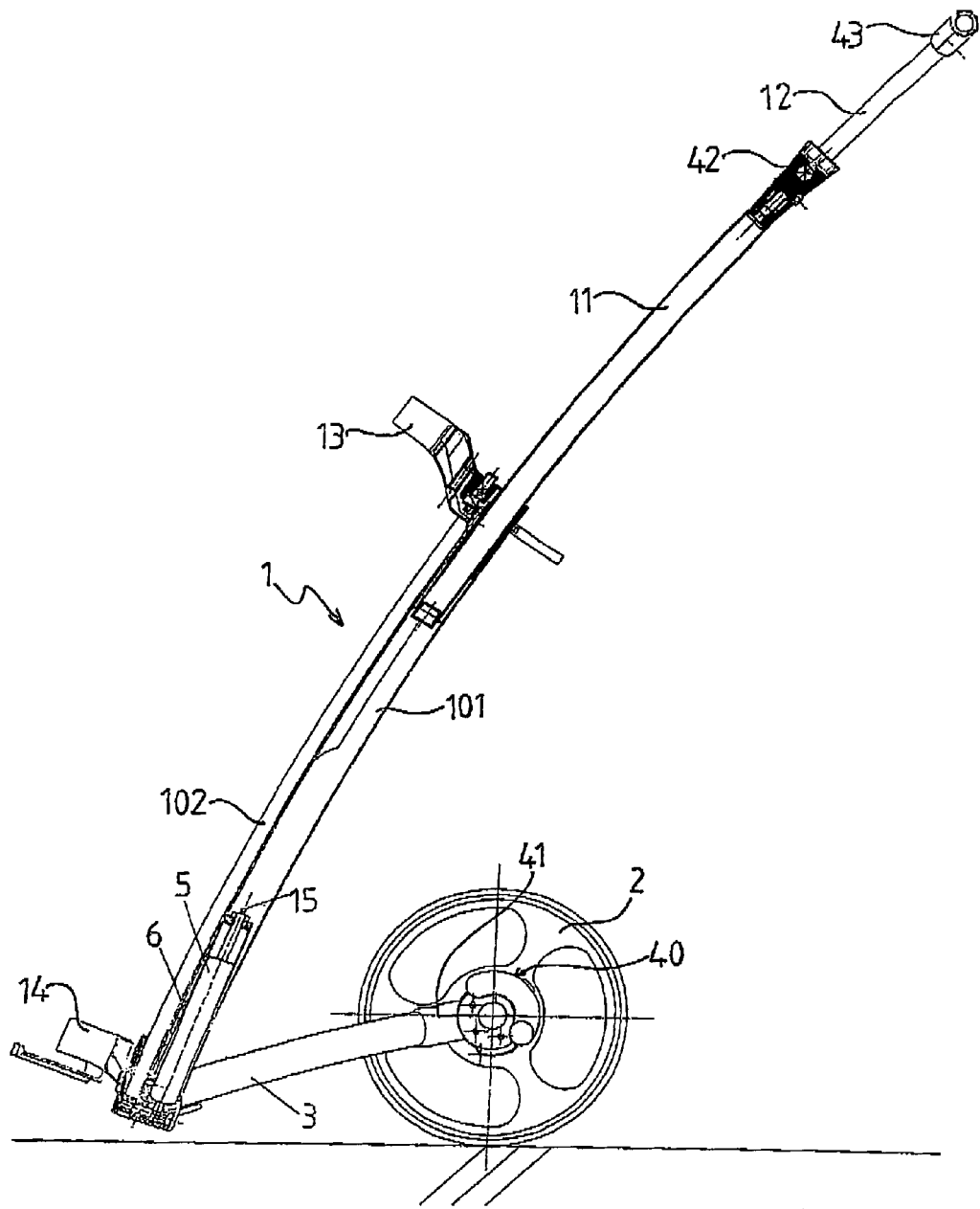

The present invention relates to a small vehicle, e.g. a caddie cart, with a frame or body and at least two wheels each connected to the body by means of a stub axle attached to the body in articulated manner, wherein the stub axles are pivotable in at least a first position in which they are folded up against the body and a second position in which the stub axles extend out from the body and which is defined as the travelling position of the small vehicle.

Such small vehicles are known from the state of the art e.g. as so-called "golf carts" or caddie carts. However, the invention is not necessarily limited to such caddie carts but also applicable to other small vehicles which have stub axles that can be folded up against a body and at the ends of which wheels are housed, wherein the stub axles are pivotable between a stowed position folded up against the body and an unfolded travelling position. These are typically vehicles which have no seat or platform to carry a driver but which are guided via a guide rod, possibly also travelling in a self-propelled mode or with remote control while the driver walks in front of, behind, or alongside the vehicle.

In general, the purpose of folding the stub axles against the body is to fold the vehicle as a whole to the smallest possible stowage dimensions in order that it can be more easily stowed and for example transported in the boot of a car. The wheels can be permanently attached to the ends of the stub axles but can also be removable in order to further improve the stowability of the small vehicle.

The consequence of the need to fold the vehicle into the smallest possible stowage dimensions is that the hinges provided between body and stub axles should lie as close as possible alongside one another against the body and for its part the body should be built relatively compact and slim. If required the body can, for its part, also be folded up but this increases its weight and makes the vehicle more complicated as a whole. In order that the vehicle has an adequate stability in the travelling position, the stub axles must accordingly be long enough in the travelling position to maintain a sufficient track width which gives the vehicle a desirable travelling stability.

Depending on the weight the cart has to carry and also the weight of the cart or its body itself, relatively large weights are carried along the hinge joint between the body and stub axles, the stub axles themselves and the wheels. In general the consequence is that, because of the weight bearing on the wheels, stub axles tend, depending on the type of vehicle, to either unfold even further and spread as wide as the hinge allows, or fold up in the direction of the frame, so that the axles of the wheels no longer run parallel like they should in the normal travelling position, but form with each other a greater or lesser angle which considerably increases the rolling friction while the small vehicle is travelling.

In order, therefore, to avoid an excessive spreading or folding-up of the stub axles in the travelling position when the vehicle is subject to stress, additional reinforcements or stays are provided between the two stub axles, or also between body and stub axles, in known carts of this type, which prevent a further spreading open or folding-up of the stub axles after reaching the travelling position of the stub axles. Because of the relative large lever action due to the correspondingly long stub axles, any stops in the hinged area would otherwise be excessively stressed and would have to be made correspondingly massive and heavy which on the one hand still fails to completely prevent the said spreading-out and on the other hand adds to both the cost and the weight of the vehicle and also makes the vehicle more difficult to manage when stowing it.

However, such reinforcements and stays have the disadvantage for their part that they can be disruptive when folding and stowing the vehicle. Moreover, these stays or reinforcements, being substantially subject only to tensile stress in the travelling position, are formed either as thin sheet-metal, wire or plastic reinforcements, as wires or plastic strips in one type of vehicle are hardly a match for the loads other than the tensile stresses for which they are provided. In another type of vehicle, corresponding thin steel sheets or round rods are exposed to compressive stress. Because of the deformations which such elements experience when the vehicle is being folded, they can sometimes twist or jam and are therefore, when folding just as when unfolding the vehicle, often exposed to additional radial stresses, shearings or bending stresses, which frequently results in corresponding elements breaking or tearing already after only brief use. In particular, stays made from cables or plastic strips very often tear after only brief use of the vehicle. This leads in turn to an overloading of the hinged area between stub axles and body which is not designed for such loads, and can quickly lead to the whole vehicle becoming unusable. Other reinforcements, such as e.g. articulated profiled sheet-metal strips or rails, can lead to injuries and to the trapping of the fingers of a user when folding and are very sensitive to radial loads.

The object of the present invention is to create a small vehicle with the features named at the outset which also guarantees the certain setting of a travelling position of the stub axles in cases of frequent use and combines increased travel convenience with easier handling.

This object is achieved in that at least one spring is provided, engages on one side at the body and on the other at the stub axles via the hinged area and by its spring force alone holds the travelling position of the stub axles without additional radial loads and stays.

Thus, whereas according to the conventional state of the art the stub axles or one stub axle and the body with the hinged area and reinforcement or stay additionally running transversely between the stub axles or between the stub axles and the body spanned a stabilization triangle, according to the invention there remains substantially the hinged area between the stub axles and the body, wherein however an additional spring is provided which holds the travelling position of the stub axles via the hinged area.

For the purposes of the present invention, the body as one engagement point of the spring optionally also comprises additional components which are rigidly secured to the body or, if they are attached movable relative to the body, at any rate when the stub axles are being unfolded into the travelling position, do not perform the same relative movement to the body as at least one of the two stub axles and which also do not protrude noticeably into the free space spanned in the travelling position by the remaining body and the stub axles.

Thus any reinforcements or stays which otherwise would be arranged in the free space between the stub axles or between stub axles and body, are dispensed with. In principle the spring could still act directly between the two stub axles, i.e. engage with one end with one stub axle and with the other end engage at the other stub axle, optionally via a cable-pull guide, wherein, however, the spring or the cable pull would have to be guided over the hinged area. However, an embodiment of the invention is preferred in which the spring engages with one end with the body and with the other end at the stub axle but here, too, limited to the hinged area and without disruptive reinforcements or stays which would lead through the free space between the unfolded stub axles and the body.

It goes without saying that the spring must still engage at the stub axle or body via a lever albeit a short one, wherein the actual lever is defined by the perpendicular distance between the actual or deflected spring engagement points and the pivotable axis at the hinge between stub axle and body.

For example for this purpose the stub axle, seen from the end of the wheel, can have an extension projecting beyond the swivel axis of the hinge at which a spring housed in the body engages. Alternatively, according to a preferred embodiment of the invention, a guide block for a cable pull connected to one end of the spring can be provided at a distance from the hinge axle so that a real lever would be produced by the shortest perpendicular distance from the cable pull to the hinge axle.

Advantageously either the body or else one or both stub axles have a cavity to house the spring, wherein the spring is best housed in a tubular section of the body and secured in the body pipe of a spring housing, while the other, relatively movable end, engages at the lever section of the stub axle projecting beyond the swivel axis. The engagement point of the spring can, however, equally well lie on the inside of the stub axle and for example be connected to one end of the spring via a cable pull arranged above a guide block located in the hinged area.

The term "spring", as is used in the present invention and in particular in claim 1 and some further dependent claims, is to be very broadly interpreted and covers both mechanical springs, in particularly strongly preloaded helical springs, and gas-pressure springs, wherein gas-pressure springs generally also have hydraulic components and are also optionally lockable, so that the gas-filled space of the spring with its spring action no longer has an effect when the spring is loaded, but a movement of the springs is achieved only by compression of a hydraulic fluid or oil. However, as such fluids are substantially not compressible, such a spring element is substantially rigid in the locked position, i.e. its two ends can barely still be moved relative to each other and are rigidly coupled via the hydraulic fluid. Nevertheless, thanks to the design of the present invention there still remains in such a position a certain spring action through the guiding of the spring forces from the frame onto the stub axles or from one stub axle onto the other, so that in this sense the mentioned spring action is retained and the term "spring" is justified. However, common to all the embodiments of the invention is that there is at least a setting possibility for the springs in the sense that through compression or expansion it defines end-positions which correspond to the end-positions of the stub axles, namely the folded-up position or the unfolded position.

An embodiment of the invention is particularly preferred in which the spring is a gas-pressure spring which can be arrested or locked at least both in the position of the stub axles folded against the body and also in the travelling position of the stub axles. Many types of gas-pressure spring generally have two chambers, separated by a flow resistance filled with hydraulic fluid, oil or other non-compressible liquid of which at least one is directly or indirectly impacted by gas pressure via a piston. The fluid (hydraulic oil) is forced from one chamber through the flow resistance into the other chamber by the gas pressure and, when a force which overcomes the gas pressure is applied, is forced back in the opposite direction. If the flow resistance is by choice a valve to be opened or closed, such a gas-pressure spring or such a hydraulic element is lockable in various positions. In this way the centre of gravity of the "spring" can be set as desired and a resetting force in the direction of the centre of gravity is obtained in the event of a deflection from the position defined thereby in any direction, wherein this resetting force is, however, substantially produced by the remaining elasticity of the remaining components of the spring and their connection to the frame or the stub axles, as the spring position, apart from the low compressibility of the hydraulic liquid and a corresponding decrease of the volumes receiving this liquid, displays a fixed position after the locking.

However, similar springs could also be used, such as are used e.g. in swivel chairs or the like, which also have variously settable zero- or end-settings, but also have a spring action in this state due to a diminishing gas volume.

The use of all the above-named types of gas-pressure springs also means that, also in the travelling position at least certain small displacements of the stub axles in both directions about an equilibrium position are still possible even if a locked gas-pressure spring strongly opposes such displacements and provides a correspondingly high resetting force. However, this elasticity increases the travelling comfort when the vehicle moves, leads to an easier ironing-out of unevennesses in the manner of a shock absorber and also reduces the forces acting on the hinged area in the case of sudden loads.

It is particularly expedient at least in vehicles which have very various loads to bear if the spring can be arrested in any chosen positions by closing a valve. This makes it possible, for example, for a small vehicle burdened by more weight to arrest a various travelling position than for a less loaded vehicle. The spring pitch additionally provided by the elasticity of the gas-pressure spring then ensures that the actual travelling position is substantially the same for the more heavily loaded vehicle as for a less loaded vehicle and in this way an optimum parallel or collinear alignment of the axles of the two wheels can be achieved so that the rolling friction of the wheels on the ground beneath and also of the edge bearings is minimal. In the case of a hand-pulled vehicle this would [mean] a noticeably lower expenditure of force for pulling or pushing the vehicle and in the case of a motor-driven vehicle this is reflected in a lower energy consumption, which is of great advantage in particular in battery-powered electric drives, because the electric drive, just like the battery noticeably contributing to the weight, can be correspondingly smaller.

Independently of the arresting of the travelling position by setting the spring, a mechanical end-stop, which is preferably provided beyond the normal travelling position or at least defines a maximum permissible travelling position, can additionally be provided in the hinged area.

An embodiment of the invention is preferred in which a single spring is attached to the body and firmly connected to this with one end, its other end being in communication with both stub axles.

In the preferred embodiment of the invention the body consists of at least two substantially parallel pipes rigidly connected to each other each connected in their lower area via a hinge section to a stub axle which is preferably also tubular.

It is also provided in the preferred embodiment of the invention that the body has a third pipe in which a further pipe, serving as a steering rod, is housed able to be telescoped and preferably arrestable in various positions and which also has a preferably removable control handle. The control handle can be equipped with corresponding operating elements for example for an electric drive of the vehicle.

The handle is preferably a loop with a round, preferably circular cross-section. The loop can also be as a whole circular, oval or substantially rectangular with sharply rounded corner regions. The loop can, but does not need to, be formed as a closed ring. Alternatively the loop could also be in the form of a semicircle or any section of a closed loop. This loop-shaped handle is preferably connected to the steering rod with the help of a snap coupling. In particular the quick-release coupling should have at least two securing positions, offset by 180° (relative to the longitudinal axis of the steering rod), at the steering rod. This makes it possible, for example, to easily rotate by 180° the loop held in the dip or a corresponding quick-release coupling after releasing the clip and secure it to the clamp again. This is expedient in particular if either handles or operating elements are provided asymmetrically at the loop so that they could not be operated equally well by left- and right-handed people in a given position. By rotation through 180° a mirror-image arrangement of these operating elements is achieved, and they are then suitably set after the change of direction of operation for a specific user. Alternatively the steering rod could also be rotatable about its longitudinal axis, but this imposes stricter limits to the design of the steering rod.

It is also expedient if the loop has a short-range transmitter, e.g. a simple transmitting coil, while the quick-release coupling part which is provided at the end of the steering rod, or else the steering rod itself, has a corresponding receiver coil. In this way it is possible to send signals to a motor control via the coupling of the two coils if the wheels of the small vehicle are driven with the help of a motor. In this way cable and plug connections between the handle which contains all the control elements and the steering rod or the body of the cart are avoided. It is understood that the above-described features of the handle can also be realized independently of the specific stub axle holder just as can the other features of the body which consists of two spaced parallel pipes and a third pipe arranged between them which serves as telescopic pipe for a removable steering rod, on which the elastic suspension of the stub axles and the design of the handle does not in principle depend.

The preferably single spring is expediently arranged centrally, i.e. in the case of the previous example between the two rigidly connected body pipes inside the third pipe, e.g. serving as a telescopic pipe for the steering rod, in the vicinity of the stub axle hinges.

While the spring keeping the stub axles in the travelling position is preferably the only spring serving this purpose, additional springs can, however, be provided which operate in the opposite direction and which, if the central spring keeping the stub axle in the travelling position is rendered ineffective, keep the stub axles in a position adjacent to the body.

The wheels are preferably connected to the stub axles via a quick-release coupling and in this way are easily removable. All the other added fittings can also preferably be brought into a stowage position lying dose against the body.

In the preferred embodiment each of the wheels has its own motor and its own motor electronics. Corresponding batteries are preferably also arranged in the same housing as the motor and preferably sit on the hub of the wheels. The motors are preferably servomotors or stepped motors with an encoder with corresponding electronics which compares the encoder pulses measured per time unit for example with correspondingly given target values.

The control system is preferably digital and the control pulses start from the handle, are connected from there via the short-range transmitter into a receiver coil on the steering column and are guided from there by cable through the frame and the stub axles to the wheels or the wheel couplings. Expediently (analogously to the handle and steering rod) either corresponding electrical contacts or in turn a short-range contactless transmitter are also integrated into the quick-release coupling of the wheels so that the motors receive corresponding control signals. Each individual wheel is equipped with an individual motor and an individual motor control and likewise also with its own energy supply in the form of a battery.

The corresponding motor units with integrated control and power supply, wherein the power supply batteries are preferably integrated removable in the motor unit, can of course also be realized on a small vehicle in which the stub axles are not held in the travelling position by spring force alone.

Figure 2:
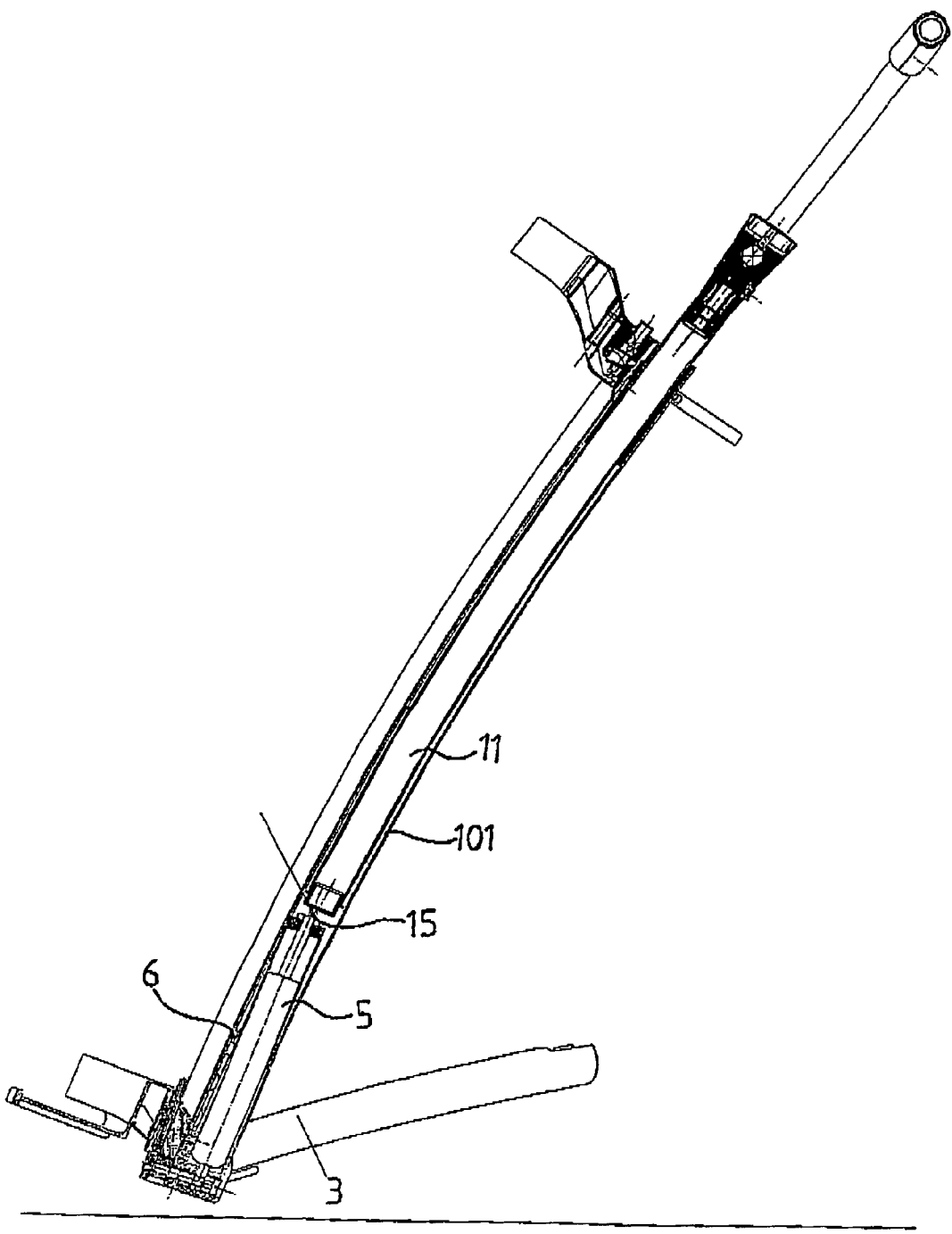
Figure 3:
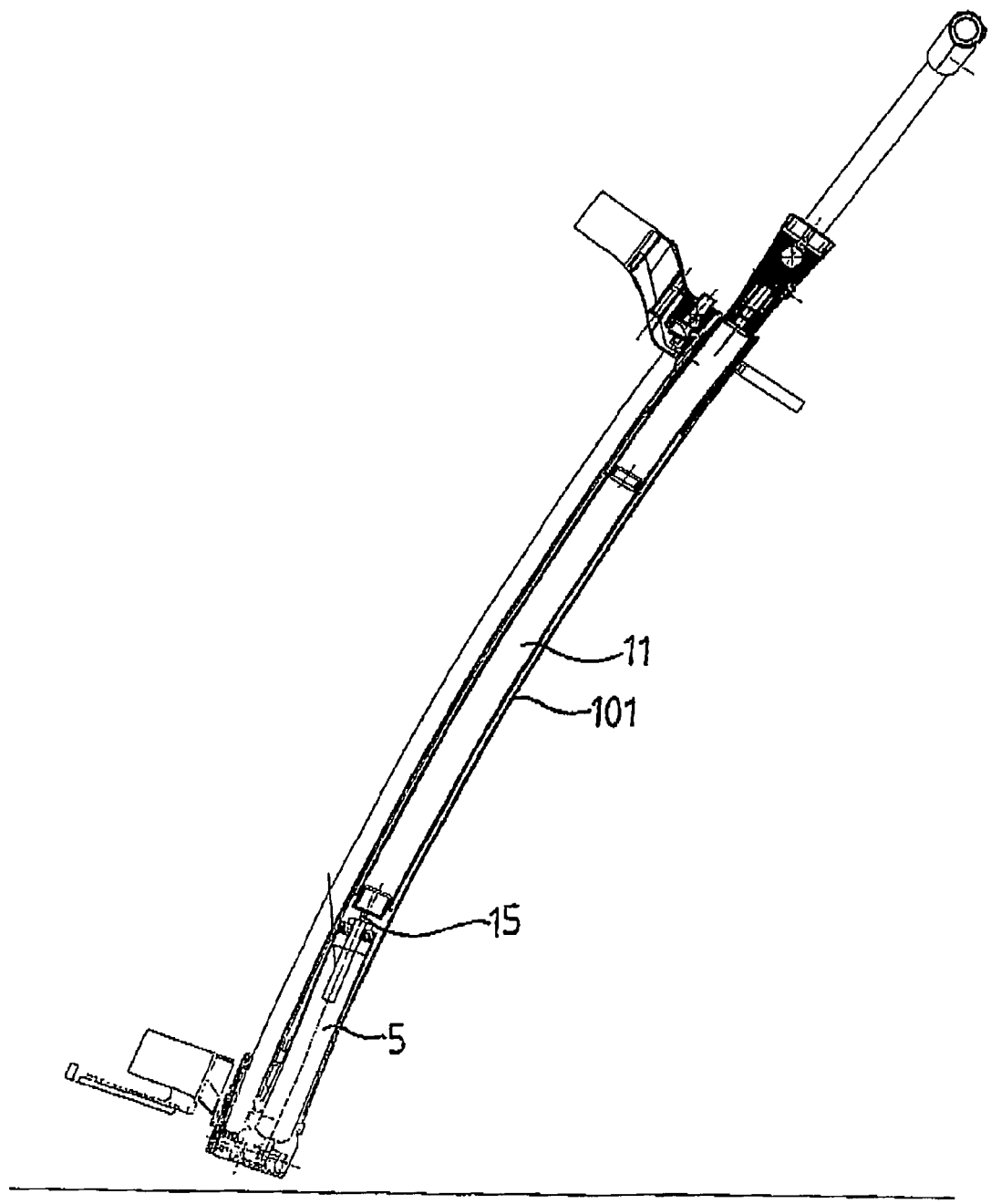
Figure 4:
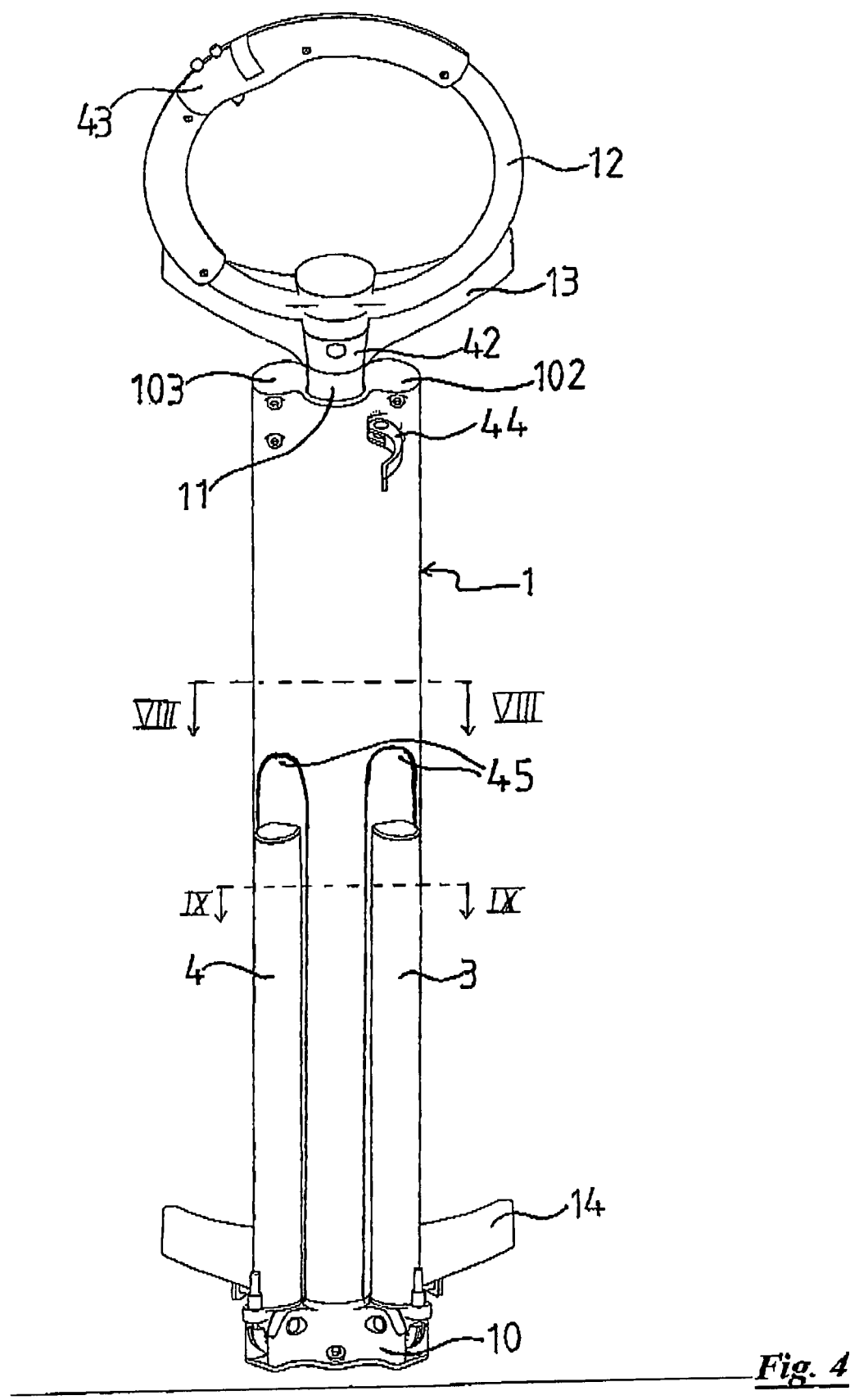
Figure 5:
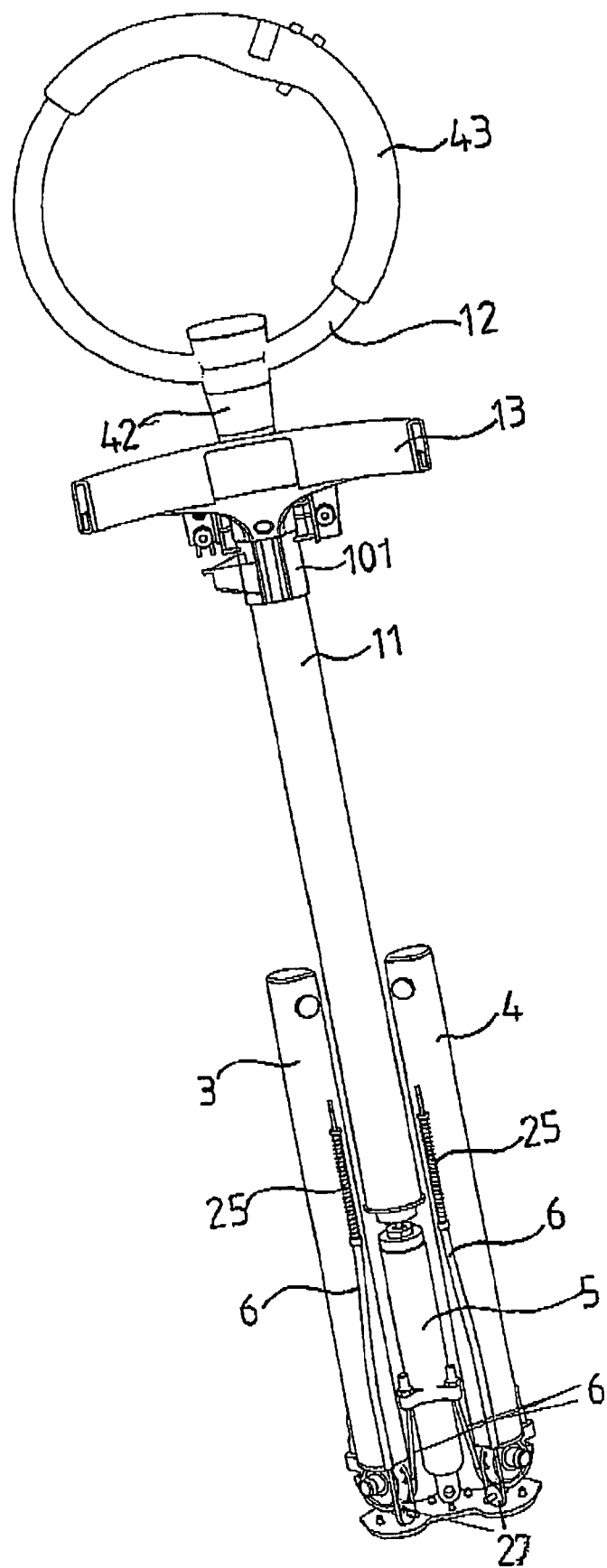
Figure 6:
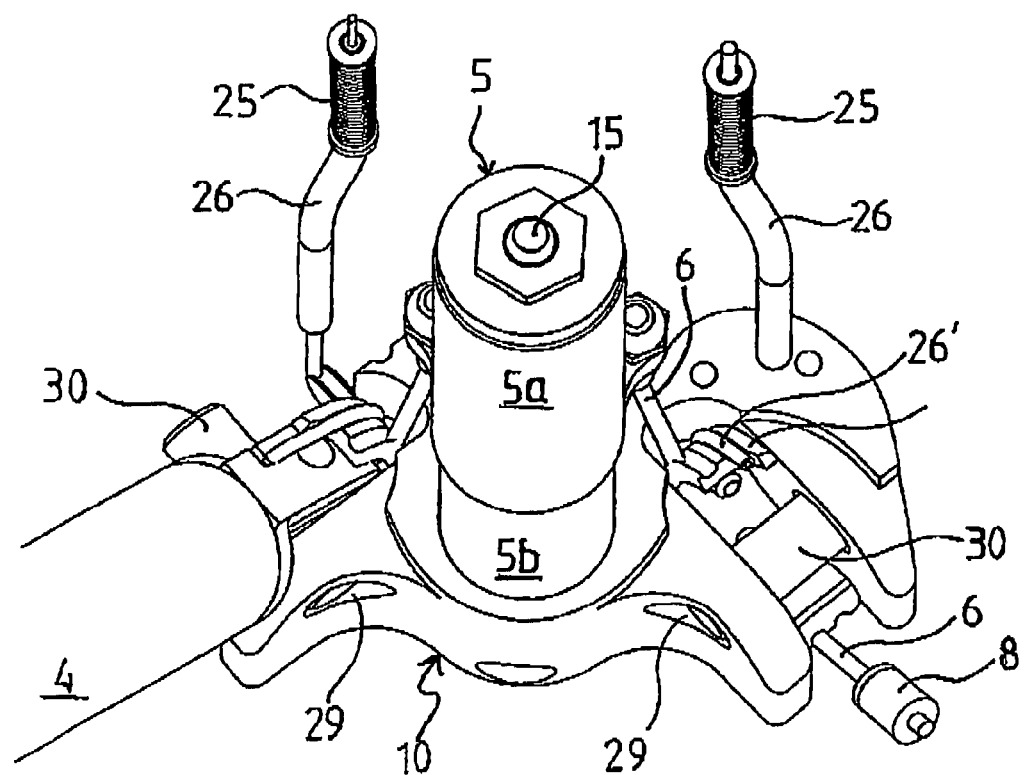
Figure 7:
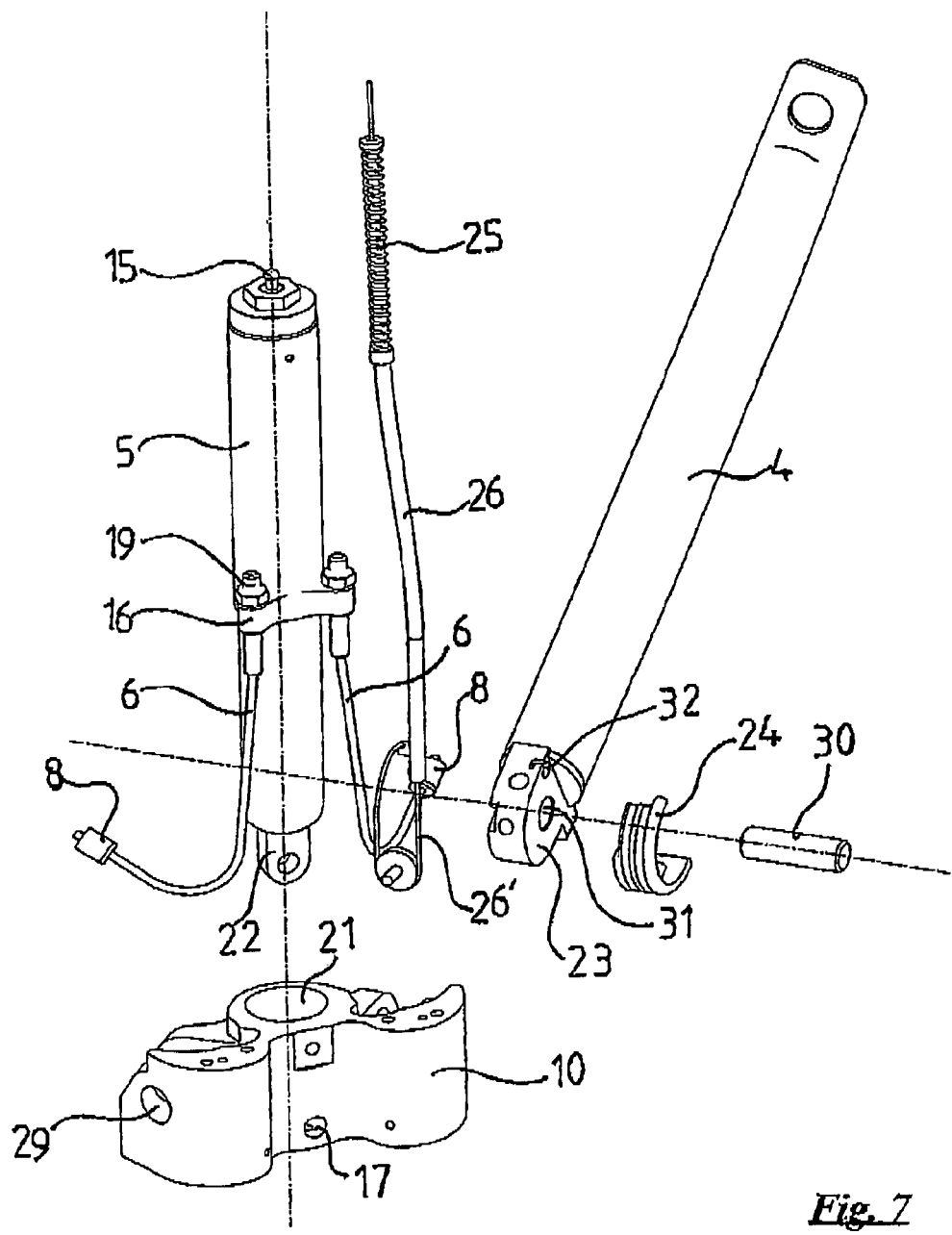
Figure 8:
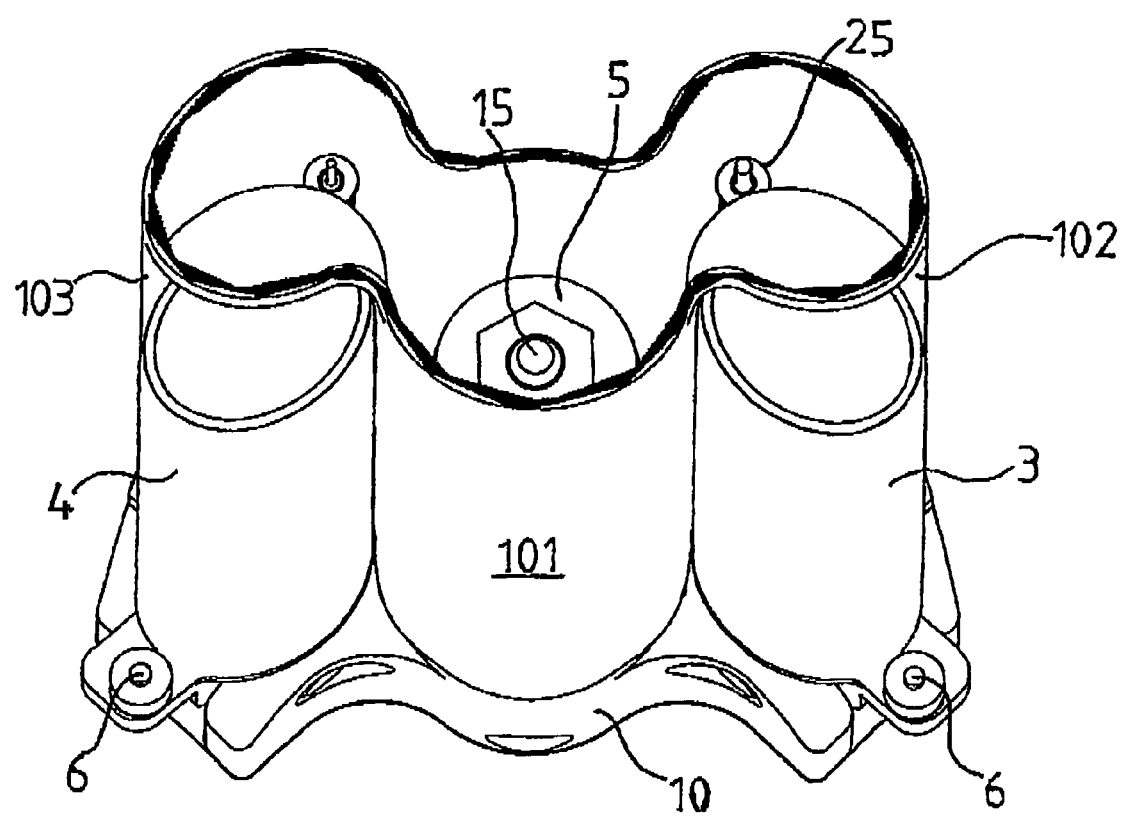

Further advantages, features and application possibilities of the present invention become clear from the following description of a preferred embodiment and the associated Figures. There are shown in:

FIG. 1 a small vehicle according to the invention in the form of a caddie cart ready for use, FIG. 2 the caddie cart according to FIG. 1 with wheels removed and an extension pipe inserted, FIG. 3 the caddie cart according to FIGS. 1 and 2, but with wheels removed and stub axles folded in, FIG. 4 a rear view of the caddie cart with stub axles folded in, FIG. 5 a front view of the cart with stub axles folded in and wheels removed, wherein the body has been largely omitted, FIG. 6 the hinged area with gas-pressure spring and a stub axle assembled but the body has been omitted, FIG. 7 the hinge section with a spring and a stub axle in an exploded representation, FIG. 8 a perspective cross-section view through the body along the section line VIII-VIII in FIG. 4

Figure 9:
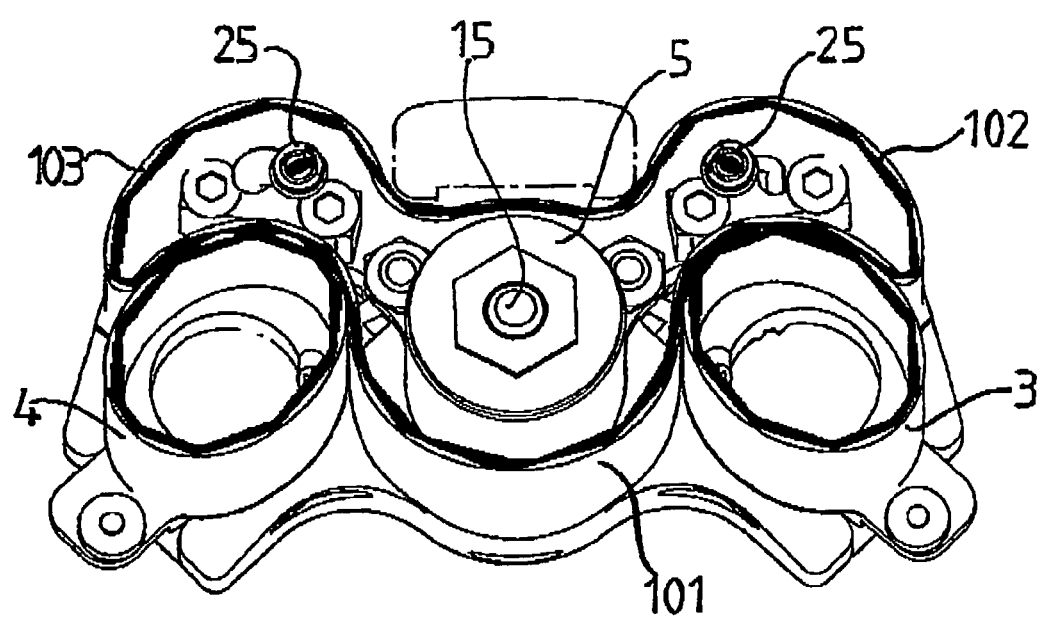

FIG. 9 a perspective cross-section view through the body along the section line IX-IX in FIG. 4.

A body 1 can be seen in FIG. 1 with stub axles 3, 4 articulated thereto and wheels held at the ends of the stub axles wherein only one of the wheels is visible in the side view according to FIG. 1.

The body consists of two slightly curved outer pipes 102, 103 at a distance from each other and a third, central pipe 101 somewhat offset lying between the two, wherein all three pipes 101, 102, 103 are connected to one another rigidly and preferably in one piece and are in particular made from a fibre-reinforced, thermoplastic material. All three pipes have, at least in their upper area, an elliptical cross-section, wherein the cross-section of the central third pipe is chosen such that a fourth pipe, which is hereinafter called steering rod or guide rod 11 and represented upwardly extended in FIG. 1, fits exactly into the central third pipe 101, wherein all three main pipes of the body 1 and the steering rod 11 run slightly curved and thus the steering rod 11 fits into the central third pipe 101 in only one clear orientation and is guided in this in the manner of a telescope.

All the parts of the body and also the steering rod 11, the stub axles 3, 4 and preferably also at least parts of the handle 12 are made from a fibre-reinforced thermoplastic plastic in the case of the golf cart according to the invention.

At the upper end of the guide rod 11 is found the removable handle 12 in the form of a ring which e.g. can be connected via plug contacts to electric terminals which are provided at the upper end of the pipe 11 at a corresponding holder. The body also has an upper golf bag holder 13 and a lower golf bag holder 14 which are preferably easily removable by a quick-release coupling or by placing onto a hook part or the like and which do not otherwise need to be described in further detail here.

If desired, the handle 12, substantially in the form of an annulus 12, can be removable. As already mentioned, in the preferred variant of the invention the handle 12 is connected to the guide rod 11 via a quick-release coupling which has an at least binary symmetry axis which makes it possible to rotate the handle 12 quickly and easily by 180° in order to convert the handle from right-handed operation to left-handed operation. As can be seen in particular from FIGS. 4 and 5, the handle 12 is not symmetrically structured, in particular as regards its operating elements which lie inside the thicker region 43 of the handle 12. FIGS. 4 and 5 show the caddie cart folded without wheels from opposite sides, which also illustrates the various orientations of the handle 12. By releasing the handle 12 of the steering rod 11, rotating it by 180° and re-securing the handle 12 to the steering rod 11, the orientation of the handle 12 is switched between FIGS. 4 and 5 so that FIG. 4 would have the position of the handle as represented in FIG. 5, and vice versa. This is equivalent to switching the handle from right-handed to left-handed operation or vice versa.

A gas-pressure spring 5 can also be seen in the longitudinal section view through the central pipe section 101 in the lower area of the pipe 101. This gas-pressure spring is indirectly connected to the pipe 101 or the whole body 1 by securing its lower section 5b (See FIG. 7) to a hinge block 10 to which the body 1 is fixed in turn. The upper spring section 5a, which is movable relative to the lower section 5b, has one holder 16 each for one end of two cable pulls 6 one each of which leads over a block or a pulley past the swivel axis to one of the stub axles 3, 4 and is connected to this.

The spring 5 is an adjustable gas-pressure spring with a closable valve so that both the travelling position represented in FIGS. 1 and 2 and the folded position corresponding to FIGS. 3 to 5 may be set at the spring, as is explained later. The hinged area is not represented in more detail in FIGS. 1 to 5, but the hinge axles 29/30 are arranged at an angle to each other (e.g., say, 90°) such that when the stub axles 3, 4 fold down into the travelling position the stub axles not only fold out from the body 1 towards the ground but also swivel away from each other so that, depending on how far away from the body they are pivoted, they span the sides of an acute-angled to a virtually roughly right-angled triangle. The wheels 2 arranged at the free ends of the stub axles 3, 4 then have a sufficient track width to give the cart a corresponding travelling stability. In particular the cart can be left also in the position represented in FIG. 1 and stand on the ground its two wheels and the lower end section of the hinged area. Because, as the stub axles are held in their travelling position only via the tension of the gas-pressure spring and the cable pulls 6, they act as rocker arms which allow a cushioned spring movement of the wheels relative to the body and thus ensure improved travel convenience, i.e. a smoother and more regular mode of travel of the cart, whereby the load (golf bag) is less shaken in order that less noise (clubs banging together) results and the energy consumption for the drive is reduced.

The wheels are, as already mentioned, removable via a quick-release coupling 41 and could for example be fitted onto the end of the tubular stub axles via a piece of pipe attached to the wheel axles, wherein corresponding holding and guiding elements are provided which establish a clear orientation of the wheel axles relative to the stub axles.

The operating principle of the caddie cart according to the invention can be best seen with reference to FIGS. 6 and 7. FIG. 6 shows a gas-pressure spring 5 which consists of a cylinder 5a above and a piston 5b below. The gas pressure in the spring tends to force apart the piston 5b and the cylinder 5a, wherein two pulleys 16 (better seen in FIG. 7) are provided at the cylinder 5a, to each of which one end of two cable pulls 6 is fixed, the other end 8 of each of which is to be connected to a stub axle 3, 4. The cable ends fixed to the pulley 16 are provided with a threaded sleeve or rod which is guided through a bore of the pulley and on the other side can be fixed in settable positions by a self-securing nut 19. The lower end of the piston 5b with its connection section 22 is introduced into the central bore 21 of a hinge block 10 and fixed therein, for example by a pin which is guided through a bore in the transversely-running connection section 22 at the lower end of the piston 5b and the bore 17 in the hinge block 10 (not represented). Naturally, the body 1 or the two outer pipes 102, 103 of the body with the third pipe 101 lying in between them, is also secured to the hinge block 10 wherein the third pipe 101 surrounds the gas-pressure spring 5 together with the pulleys 16 and the cable pulls 6. At its front end in FIG. 6 the stub axle 4 has a hinged attachment 23 with a central bore 31 which has a substantially semicircular profile and includes some recesses 32 for connecting to the cable end 28 of a Bowden wire 26 and also to the cable end 8 (the latter not visible in the Figures), is Fitted onto the semicircular end of the hinged attachment 23 is a semimonocoque pulley 24, which effectively acts as guide roll for one of the cable pulls 6 and for the cable 26' of the Bowden wire 26. A pin 30 connects the stub axle 4 or its attachment 23 to the bearing block or hinge block 10 by being guided through bores 29, one of which can be seen at the hinge block 10, and through the central bore of the attachment 23, and a hinge connection thus forming between the stub axle 4 and the body 1 of the caddie cart, as the hinge block 10 is firmly connected to the body or the pipes of the body 1.

The cable pull 26 of the Bowden wire 26 is pretensioned by a spring 25 and the free end 28 of the cable pull 26' is brought into engagement with a matching recess 32 in the attachment 23 of the stub axle 3 and is then guided in a groove of the pulley 24 and over a guide roll 27. The cable pull 26' is guided via the cable disk in a direction which effectively causes the stub axle 3 to rise into the folded position when the spring 25 is pretensioned to pressure at the Bowden wire 26. This spring 25 thus pulls at the stub axle 4 in precisely the opposite direction to the gas-pressure spring 5, whose cable pull 6 is laid in precisely the opposite direction around the cable disk 24 and, on the side not visible in FIG. 6, is brought into engagement with a further recess of the attachment 23, wherein the gas pressure in the gas-pressure spring 5 forcing the cylinder 5a away from the hinge block 10 pulls the stub axles 3, 4 into a folded position over the cable pulls 6.

The gas-pressure spring also has a valve actuator 15. The actuation of this valve 15 makes possible a relative displacement of gas in the internal volumes of the gas-pressure spring such that piston 5b and cylinder 5a can be further displaced relative to each other without the restoring force of the spring increasing or hindering the relative displacement. It is understood that the force of the gas-pressure spring 5 is much greater than the forces exerted by the helical springs 25 which act in the opposite direction and the purpose is merely that for example because of the actuation of the valve 15 and, should one of the stub axles 3 swing up, in order to bring the gas-pressure spring 5 into the drawn-in position that can be seen in FIG. 3, the force of the spring 25 is sufficient in every case to swing up the second stub axle 3 with it into the folded position.

The fitting of the two cable pulls 6 and 26 respectively in opposite directions can be seen particularly clearly in FIG. 7. FIG. 7 shows the hinged area in a partly assembled state, wherein the stub axle 3 is omitted on one side and on the other side the stub axle 4 is represented fitted. The hinge between stub axle 4 and frame or body 1 is formed by the pin 30 which simultaneously penetrates the central bore of the stub axle attachment 23 and the flush bores 29 on both sides of the corresponding receiving slot of the hinge block 10. The cable disk 24, represented here without the attachment 23 of the stub axle 3, can additionally be seen in the right-hand housing slot.

In FIGS. 1 to 3, a particular type of valve actuator with the help of the steering column 11 can also be seen. The steering column 11 is telescopically housed in the same central pipe 101 of the body 1 in the lower end of which the gas-pressure spring 5 is also located. The valve actuator 15 is arranged on the end surface of the gas-pressure cylinder 5a in the form of a projecting button and is also pretensioned in this projecting position. This button 15 projects upwards out of the gas-pressure cylinder 5a and operates as a kind of selector for a valve and in one of its switching states defines for example a locked position of an internal valve in which the gas-pressure spring has a relatively large spring constant and a correspondingly large rigidity. If, on the other hand, the valve actuation button 15 is pressed in, the switch changes into another position in which the valve is opened and in this state cylinder 5a and piston 5b can be pushed together with relatively little application of force, wherein on the inside of the gas-pressure spring 5 a fluid pretensioned on one side is pushed over a flow resistance between various volumes.

In another variant of the valve actuator 15, by pressing in the actuator or the button 15, the valve is opened between the two volumes, receiving a hydraulic fluid or the like, wherein this actuation button 15 is pretensioned and the valve closes again as soon as the pressure on the button eases. In this variant, to keep the valve open a corresponding pressure must be permanently exerted on the valve actuator via the telescopic rod, in order that the valve remains open and the stub axles can be moved into a desired position, i.e. either into the unfolded or into the folded-up position. As soon as the desired position is reached, the guiding of the telescopic pipe can be ended and the end of the telescopic pipe is partly withdrawn in order to free the valve actuation, whereby the valve is closed again.

As can be seen for example in FIG. 2, in order to fold up the caddie cart the steering column 11 is pushed into the central, third pipe of the body 1 and in the process finally strikes the projecting actuation button 15 of the gas-pressure spring 5 with its suitably designed end. In turn, the valve is thereby opened, as already mentioned, and the spring force can now be easily overcome by one of the rocker arms 3 being raised by hand, wherein the cable pull 6 tenses and, via the pulley 16 attached to the cylinder 5a, pulls the cylinder 5a further onto the piston 5b. Then the steering column 1 can be guided in order for example to actuate the valve again and fix it or make it "rigid" in a similar way in the folded-in position of the stub axles 3, 4. If one of the two stubs 3, 4 is raised for the folding up of the caddie cart the cylinder 5a is thereby pulled onto the piston 5b and simultaneously the force exerted on the second cable pull 6 via the pulley 16 eases. In this case the force of the pressure spring 25 is enough to also raise the other stub axle 4 or 3 via the Bowden wire 26 and fold it in. This simplifies the operation of the cart when folding it together. After both stub axles 3, 4 are folded in, the steering rod 11 can be pulled back a bit further in order to free the valve actuator 15 so that the valve concerned remains locked and thus essentially fixes the gas-pressure spring 5 in this position.

To fold out the stub axles or rocker arms 3, 4, the steering rod 11 with its lower free end is pressed again onto the valve actuator 15 in order to open the valve and the gas-pressure spring then expands again, wherein the rocker arms 3, 4 are folded out over the cable pulls 6. By renewed brief actuation of the valve actuator 15 the valve is locked again and the rocker arms are then held in their folded-out position by the gas-pressure spring. It is understood that, apart from the advantage of valve actuation, a strongly pretensioned helical spring whose folded-in position would then have to be locked by other means, may be used instead of the gas-pressure spring.

FIG. 8 shows a perspective cross-section through the body 1 with a section along the line VIII-VIII in FIG. 4. As is seen, the pipes 101, 102, 103 are not complete pipes, rather they are open along the insides facing one another and connected to one another to form a body 1 which encloses a common cavity of all three pipes 101, 102 and 103. The cross-section of each individual pipe 101, 102 and 103 is substantially elliptical, wherein the steering rod 11 to be introduced into the central pipe 101 also has a corresponding, substantially elliptical cross-section whose major axis runs substantially horizontally in the orientation represented in FIGS. 8 and 9, whereas the major axes of the ellipses which define the cross-sections of the two outer pipes 102 and 103 form an angle of approximately 45° with same and of approximately 90° with each other.

In the view represented in FIG. 8 the lower area of the pipes 102, 103 in which the two stub axles 3, 4 are folded in are seen, and additionally the gas-pressure spring with the valve actuator 15 is seen below in the central pipe 101.

All three pipes are, or the body 1 comprising the three connected pipes is, attached to the lower hinge part 10, as will now be described in more detail.

A section through the body 1 and the adjacent stub axles 3, 4 at a somewhat deeper position than in FIG. 8 is seen in FIG. 9. While the central pipe 101 has substantially the same cross-section form here as in the illustration according to FIG. 8, it is seen that the two outer pipes 102, 103 are strongly deformed compared with the shape represented in FIG. 8 and their cross-section is somewhat sickle-shaped. In this way, on the outside of the body on the concave side of the sickle cross-section cavities are formed into which the two stub axles 3, 4 can be folded, which likewise consist of pipes which have a substantially elliptical cross-section, wherein this cross-section is substantially the same as the cross-section of the pipes 102, 103 in their upper region and also the major axes of the ellipses defining the cross-section in turn form an angle of approximately 90°. The transition from the elliptical to the sickle-shaped cross-section of the two outer pipes 102, 103 is substantially continuous in a transition region 45 indicated in FIG. 4.

The swivel axes which are defined by the position of the axle journals 30 run substantially parallel to the small half-axles of the ellipses defining the cross-section of the stub axles 3, 4.

In both FIGS. 8 and 9 the gas-pressure spring 5 with the valve actuator 15 is seen in the central pipe 101 and in FIG. 9 the additional springs 25, arranged in the lower area of the sickle-shaped pipes which are connected to the stub axles 3, 4 via a Bowden wire, are clearly seen and pull these into the represented position if no greater counter force is applied by the gas-pressure spring 5.

The hinge part 10 is secured to the body 1 for example by an upper section of the hinge part 10 having a cross-section which corresponds substantially to the cross-section of the cavity formed by the three pipes 101, 102 and 103 in the lower area so that the body can be secured onto this upper section of the hinged area 10. It can then be secured by pins transversely running or by other additional securing elements which extend into the hinge part and are fixed therein and on the other side also extend into the body and are again e.g. fixed to same by pins engaging transversely into the body.

Within the meaning of an original disclosure all the features of the small vehicle and of its units described in the present patent application such as for example the handle or motor units are, both individually and independently of one another, also to be considered disclosed in any combinations with one another if a corresponding combination or an omission of features is not necessarily ruled out in the view of a person skilled in the art on the grounds of technical relationships, without explicit list of such features and combinations of features having been included here.

The invention claimed is:

1. A small vehicle with a body and at least two wheels each connected to the body via first and second stub axles attached to the body via a hinge, wherein the stub axles are pivotable in a first position in which they are folded up against the body and a second position in which the stub axles extend out from the body in a traveling position wherein at least one spring is provided which engages on one side at the body and on the other at the stub axles via said hinge and by its spring force alone holds the traveling position of the stub axles without additional radial reinforcements and stays; and wherein at least either the body or one or both stub axles have, at their sections adjoining the hinge, a hollow section in which the spring is housed.

2. A small vehicle according to claim 1, wherein the spring is secured to the body at one end and engages the stub axles with the other end.

3. A small vehicle according to claim 1 wherein the spring is secured to the body at one end and engages the stub axles with the other end.

4. A small vehicle according to claim 1, wherein the spring engages at a section of the stub axles, projecting beyond the hinge as seen from the wheel of the stub axles.

5. A small vehicle according to claim 1, wherein a mechanical stop is provided in the hinge between the body and stub axles which, in addition to the spring, limits a traveling position unfolded to the maximum of the stub axles.

6. A small vehicle according to claim 1, wherein the wheels are removably attached to the stub axles via a quick-release coupling.

7. A small vehicle with a body and at least two wheels each connected to the body via first and second stub axles attached to the body via a hinge, wherein the stub axles are pivotable in a first position in which they are folded up against the body and a second position in which the stub axles extend out from the body in a traveling position, wherein at least one spring is provided which engages on one side at the body and on the other at the stub axles via said hinge and by its spring force alone holds the traveling position of the stub axles without additional radial reinforcements and stays, wherein the spring is a gas-pressure spring which can be locked at least in the traveling position of the stub axles.

8. A small vehicle according to claim 7, wherein the gas-pressure spring is arranged centrally in the lower area of the body and secured by one end to the body or to a hinge rigidly connected to the body, wherein one end of the gas-pressure spring is connected via a cable pull, to the associated stub axles, wherein the cable pull is guided at a distance from the hinge over a guide block arranged beyond the hinge or a pulley; wherein each of said hinge and pulley is attached to the hinge end of the stub axles and secured to the stub axles.

9. A small vehicle with a body and at least two wheels each connected to the body via first and second stub axles attached to the body via a hinge, wherein the stub axles are pivotable in a first position in which they are folded up against the body and a second position in which the stub axles extend out from the body in a traveling position wherein at least one spring is provided which engages on one side at the body and on the other at the stub axles via said hinge and by its spring force alone holds the traveling position of the stub axles without additional radial reinforcements and stays; wherein the body consists of two substantially parallel outer pipes rigidly connected to each other, each of which is connected in their lower area via said hinge to one of the stub axles; and wherein there is arranged between the two outer pipes of the body a third pipe which serves as a guide pipe for a steering rod housed therein.

10. A small vehicle according to claim 9, wherein each of the two outer pipes has in its lower area a recess to house the folded-up stub axles.

11. A small vehicle according to claim 9, wherein said spring is a gas-pressure spring arranged in the lower area of the third pipe and has a valve which can be actuated by pushing the steering rod into the third pipe.

12. A small vehicle according to claim 9, wherein there is provided at the steering rod a removable, asymmetrical handle that can also be mounted in at least two positions.

13. A small vehicle with a body and at least two wheels each connected to the body via first and second stub axles attached to the body via a hinge, wherein the stub axles are pivotable in a first position in which they are folded up against the body and a second position in which the stub axles extend out from the body in a traveling position wherein at least one spring is provided which engages on one side at the body and on the other at the stub axles via said hinge and by its spring force alone holds the traveling position of the stub axles without additional radial reinforcements and stays; wherein each of the stub axles is pretensioned by an additional spring in the direction of the folded-in position; wherein the additional spring acts on the hinge via a Bowden wire and a guide roll.

* * * * *

UNITED STATES PATENT AND TRADEMARK OFFICE
CERTIFICATE OF CORRECTION

| | | |
|---|---|---|
| PATENT NO. | : 7,740,250 B2 | |
| APPLICATION NO. | : 10/585383 | |
| DATED | : June 22, 2010 | |
| INVENTOR(S) | : Muller et al. | |

It is certified that error appears in the above-identified patent and that said Letters Patent is hereby corrected as shown below:

Col. 5, Line 8, "dip" should read as -- clip --

Col. 5, Line 51, "dose" should read as -- close --

Signed and Sealed this
Eighth Day of February, 2011

David J. Kappos
*Director of the United States Patent and Trademark Office*